United States Patent
Keskar

(10) Patent No.: US 11,086,830 B2
(45) Date of Patent: Aug. 10, 2021

(54) SYSTEM AND METHOD FOR IDENTIFYING DUPLICATE DOCUMENT SUBMISSION ON A PUBLISHING PLATFORM

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 141 days.

(21) Appl. No.: 16/511,388

(22) Filed: Jul. 15, 2019

(65) Prior Publication Data

US 2020/0034343 A1     Jan. 30, 2020

Related U.S. Application Data

(60) Provisional application No. 62/702,512, filed on Jul. 24, 2018.

(51) Int. Cl.
| | | |
|---|---|---|
| *G06F 7/02* | (2006.01) |
| *G06F 16/00* | (2019.01) |
| *G06F 16/215* | (2019.01) |
| *G06F 16/22* | (2019.01) |
| *G06F 16/958* | (2019.01) |
| *G06F 16/93* | (2019.01) |
| *G06F 16/174* | (2019.01) |

(52) U.S. Cl.
CPC ........ *G06F 16/215* (2019.01); *G06F 16/1748* (2019.01); *G06F 16/22* (2019.01); *G06F 16/93* (2019.01); *G06F 16/958* (2019.01)

(58) Field of Classification Search
CPC ........ G06F 16/215; G06F 16/22; G06F 16/93; G06F 16/958; G06F 16/1748
See application file for complete search history.

(56) References Cited

U.S. PATENT DOCUMENTS

| | | | |
|---|---|---|---|
| 8,046,372 B1* | 10/2011 | Thirumalai | G06F 16/313 707/749 |
| 2014/0074860 A1* | 3/2014 | Medelyan | G06F 16/36 707/748 |
| 2019/0042368 A1* | 2/2019 | Khatri | G06F 9/441 |

OTHER PUBLICATIONS

Fu, Deqiang et al, "WASTK: A Weighted Abstract Syntax Tree Kernel Method for Source Code Plagiarism Detection," Hindawi Publishing Corporation Scientific Programming, vol. 2017. (Year: 2017).*

Osman, Ahmed et al, "Plagiarism Detection Using Graph-based Representation," Journal of Computing vol. 2 Issue 4, 2010. (Year: 2010).*

* cited by examiner

*Primary Examiner* — Bruce M Moser
(74) *Attorney, Agent, or Firm* — Ziegler IP Law Group, LLC

(57) ABSTRACT

Disclosed is a system and method for efficient comparison of experimental research documents to identify original research work. The system when operated, provides a platform for comparing a user submitted document with documents existing in the platform and documents available in public domain. Further, the system is capable of identifying originality and the similarity of the user submitted documents, in comparison with existing documents, based on a calculated similarity index.

18 Claims, 8 Drawing Sheets

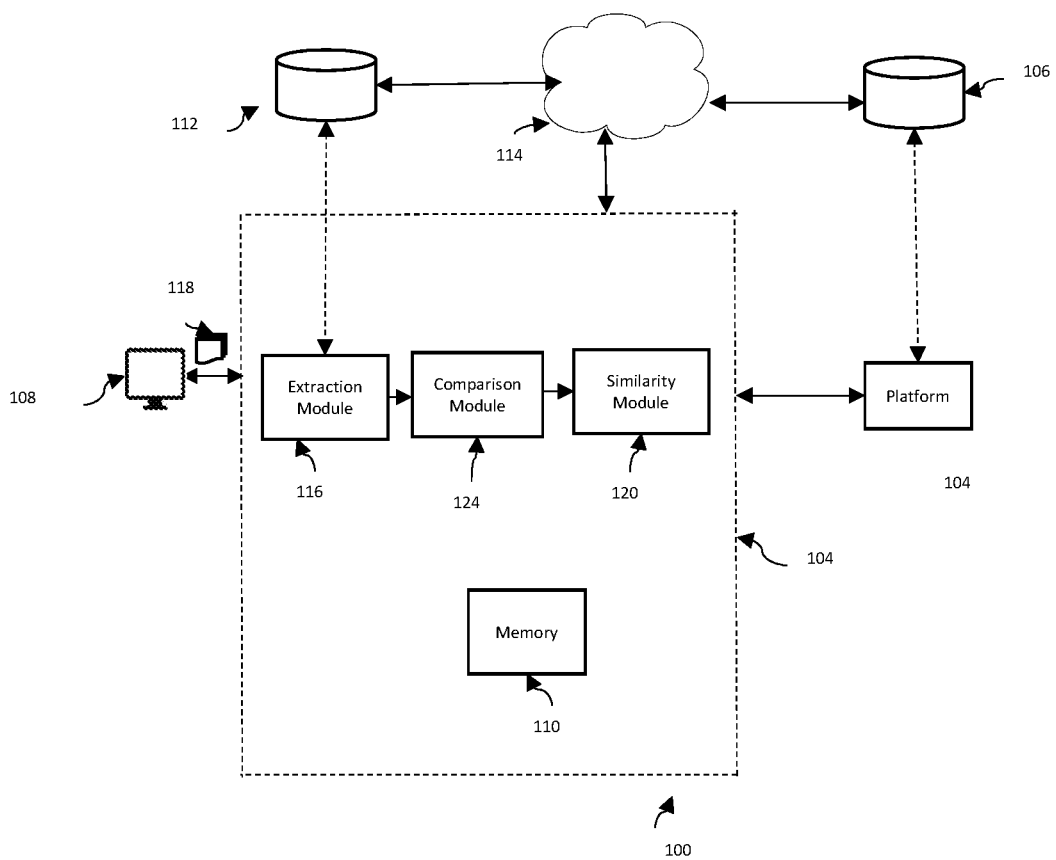
Fig : 1

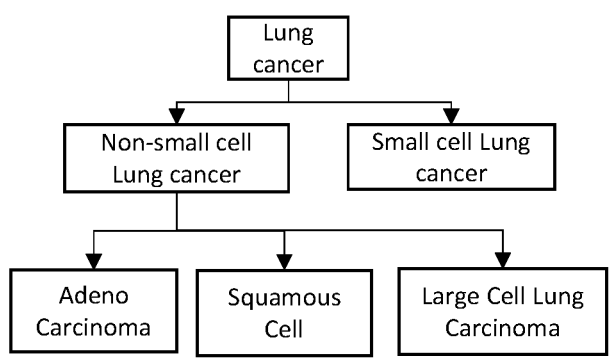
Fig : 2A
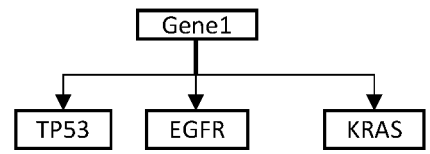
Fig : 2B

| Disease Alias | Disease Name |
|---|---|
| D1 | Lung cancer |
| D2 | Non-small cell lung cancer |
| ……. | ……… |
| ……. | ……… |
| D78 | Pro-inflammatory cytokine |
| D79 | Multiple Myeloma |

Fig : 3A

| Target Alias | Target Name |
|---|---|
| T1 | KRAS |
| T2 | EGFR |
| ……. | ……… |
| ……. | ……… |
| T12 | Cortex |
| T14 | Hippocampi |

Fig : 3B

| Drug Alias | Drug Name |
|---|---|
| R1 | Cetuximab |
| R2 | Erbitux |
| ……. | ……… |
| ……. | ……… |
| R432 | LPS |
| R433 | RTN |

Fig : 3C

| Pi value Alias | Pi value range |
|---|---|
| H | >=60 |
| M | >=25 and<60 |
| L | <25 |

Fig : 3D

| Document Identifier | Disease | Disease-to-Pathway Statistical Significance | Pathway | Pathway-to-Target Statistical Significance | Target | Target-to-Drug Statistical Significance | Drug | Domain-labels |
|---|---|---|---|---|---|---|---|---|
| S1 | D1 | L | P753 | | | | | D1-L-P753 |
| S2 | | | P227 | H | T81 | | | P227-H-T81 |
| S3 | D941 | M | | | | | R432 | D941-M-R432 |
| S4 | D941 | M | P713 | H | T413 | | | D941-M-R432, P713-H-T413 |
| ........ | ....... | ......... | ......... | ............ | ...... | ............ | ......... | ............ |
Fig : 4

| Document Identifier | Disease | Disease-to-Pathway Statistical Significance | Pathway | Pathway-to-Target Statistical Significance | Target | Target-to-Drug Statistical Significance | Drug | Domain-labels |
|---|---|---|---|---|---|---|---|---|
| S1 | D1 | L | P753 | | | | | D1-L-P753 |
| S2 | | | P227 | H | T81 | | | P227-H-T81 |
| S3 | D941 | M | | | | | R432 | D941-M-R432 |
| S4 | D941 | M | P713 | H | T413 | | | D941-M-R432, P713-H-T413 |
| ........ | ....... | ......... | ........ | ............ | ...... | ........... | ......... | ........... |

| Document Identifier | Disease | Disease-to-Pathway Statistical Significance | Pathway | Pathway-to-Target Statistical Significance | Target | Target-to-Drug Statistical Significance | Drug | Domain-labels |
|---|---|---|---|---|---|---|---|---|
| E1 | D9 | L | P751 | | | | | D9-L-P751 |
| E2 | | | P102 | L | T99 | | | P102-L-T99 |
| E3 | D202 | H | | | | | R420 | D202-H-R420 |
| ........ | ....... | ......... | ........ | ............ | ...... | ........... | ......... | ........... |

Fig : 5

SYSTEM AND METHOD FOR IDENTIFYING DUPLICATE DOCUMENT SUBMISSION ON A PUBLISHING PLATFORM

CROSS REFERENCE TO RELATED APPLICATIONS

This application claims priority to U.S. Provisional Patent Application No. 62/702,512 filed Jul. 24, 2018, which is hereby incorporated by reference in its entirety.

TECHNICAL FIELD

The present invention relates generally to comparison of documents and more specifically to comparison of experiment reports, and journals to detect and prevent plagiarized documents from being published on a publication platform.

BACKGROUND

Generally, the results of drug research programs are published on platforms such as digital libraries, journals and magazines. Documents authored by researchers/scientists are generally based on previous knowledge or concepts known to them and those which are already in public domain. It has been observed that authors frequently engage in the act of plagiarism, whether due to intentional or unintentional copying and often re-express knowledge sourced from public domain. Further, two or more authors/researchers may, inadvertently, end up performing same research and publishing their identical/similar research information. Hence, it is essential to ensure that only genuine and original research is published so that researchers are not burgeoned by redundant and junk information. Further, there exists a possibility of plagiarized attempts being made, in name of new research work, to scrounge on work of other researchers. Solution to the above-mentioned problem lies in conforming, before publishing any document, that the document is not already published, in effect, in the public domain.

Conventionally, plagiarism detectors have been used to identify plagiarized or near-duplicate documents. Plagiarism detectors identify duplicate documents by use of computed checksums for documents. Further, many plagiarism detectors use open source programs such as "diff" to identify longest common sub-sequence. Alternatively, peer-review of to-be published documents has been used to identify documents providing redundant information. Peer-review groups maintain an index and log of already reviewed articles/journals and every time a new document comes up for review, they identify if a similar research material has already been reviewed by them.

However, a user can easily by-pass the plagiarism detection systems by paraphrasing and using alternative terms instead of terms used in the original, documents. In other words, the present plagiarism detectors are unable to identify such concealed plagiarism. Moreover, the plagiarism detectors are unable to identify duplicate-ness at conceptual level. Further, plagiarism detection involves processing of a large number of documents that is computationally challenging and memory intensive in addition to being time-consuming. Manual review by peer-review groups of ever-expanding number of journals and research publications is not feasible option given the exponential surge in information available for copying in the data driven world. Moreover, manual review is a time-intensive process and delays the publication by almost 1-2 years, given the limited number of reviewers. Furthermore, manual review does possess inherent risks of personal bias in scrutiny of publications.

Therefore, currently there exists no system to efficiently and swiftly compare experimental research documents to identify originality, plagiarism and similarity of a particular document. Given this problem, a system and method to identify an originality of a document by efficiently comparing a document with one or more existing documents is provided as a solution to the mentioned problem.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The present invention discloses a system and method to efficiently and swiftly determine an originality of a submitted document on a publishing platform with respect to existing knowledge in the public domain by comparing the submitted document against a plurality of previous documents.

According to one aspect of the present invention, a method for identifying duplicate and near-duplicate documents submitted for publication on a publishing platform is provided wherein the submitted document is compared, based on at least one alias assigned to each of the plurality of previous documents. The alias assigned to the submitted document is based upon extracted one or more concepts from the document wherein the one or more concepts are derived from an ontology related to a technical domain of the submitted document. The method further comprises calculating a similarity score between the submitted document and the one or more previous documents with similar domain label and based on a predefined threshold distance from the submitted document, one or more duplicate or near-duplicate document is identified.

In another aspect of the present invention, a system and method for preventing a publication of submitted document that is duplicate or near duplicate of one or more previous documents is provided.

In another aspect of the present invention, a system and method for determining plagiarised content in a submitted document by comparing, on a concept level, to one or more previous documents is provided.

In another aspect of the present invention, a unique method of tagging a submitted document based on the content of the submitted document is provided.

In accordance with the above-mentioned features, the present invention provides a computer-implemented method for identifying a duplicate document submission on a publishing platform, the method comprising:
  receiving a request for publication of a document on the publishing platform;
  triggering an extraction module to extract one or more concepts, and meta-information from the document, wherein the one or more concepts are associated with at least one ontological databank related to a technical domain of the document;
  assigning at least one domain label for the document, wherein the domain label comprises a structured combination of a plurality of aliases for the one or more concepts and wherein the plurality of aliases is selected from a master repository of alias-concept index;

comparing the domain label of the document with the domain label of one or more previous documents to identify one or more documents with an identical domain label;

calculating a similarity score against the one or more documents with the identical domain label;

identifying the duplicate document submission based on the calculated similarity score wherein identifying the duplicate document submission is based upon the determination of at least one document of the one or more previous documents with the identical domain label being within a predefined threshold;

preventing the publication of the document on the publishing platform based on the identification of the duplicate document submission.

In another aspect and in accordance with the above-mentioned features, the present invention provides a system for identifying a duplicate document submission on a publishing platform, the system comprising:

a processor;

a memory configured to execute machine readable instructions that, when executed by the processor, configure the system to perform a plurality of operations, the operations comprising:

receiving a request for publication of a document on the publishing platform;

triggering an extraction module to extract one or more concepts, and meta-information from a document, wherein the extracted one or more concepts are associated with at least one ontology related to a technical domain of the document;

assigning a domain label for the document, wherein the at least one domain label comprises a structured combination of a plurality of aliases for the extracted one or more concepts and wherein the plurality of aliases is selected from a predefined master repository of alias-concept index;

comparing the domain label of the document with the domain label of one or more previously existing documents to identify at least one document with a similar domain label;

calculating a similarity score against the identified at least one document with similar domain label;

identifying the duplicate document submission based on the calculated similarity score wherein identifying the duplicate document submission is based upon the identified at least one being within a predefined threshold distance from the document; and preventing the publication of the document on the publishing platform based on the identification of the duplicate document submission.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 1 is a schematic illustration of a system configured to determine plagiarism and similarity in a received document based on efficient comparison with existing documents in accordance with an embodiment of the present disclosure;

FIG. 2A depicts a sample portion of a disease ontology as used in the preferred embodiments of the present invention.

FIG. 2B depicts a sample portion of a Gene ontology as used in the preferred embodiments of the present invention.

FIG. 3A depicts an alias-concept index for Diseases.

FIG. 3B depicts an alias-concept index for Targets.

FIG. 3C depicts an alias-concept index for Drugs.

FIG. 3D depicts an alias-concept index for pi-values.

FIG. 4 depicts a master label repository.

FIG. 5 depicts the master label repository divided into two sub-groups of document existing locally and documents available in public domain.

DETAILED DESCRIPTION OF THE EMBODIMENTS

Figure 6:
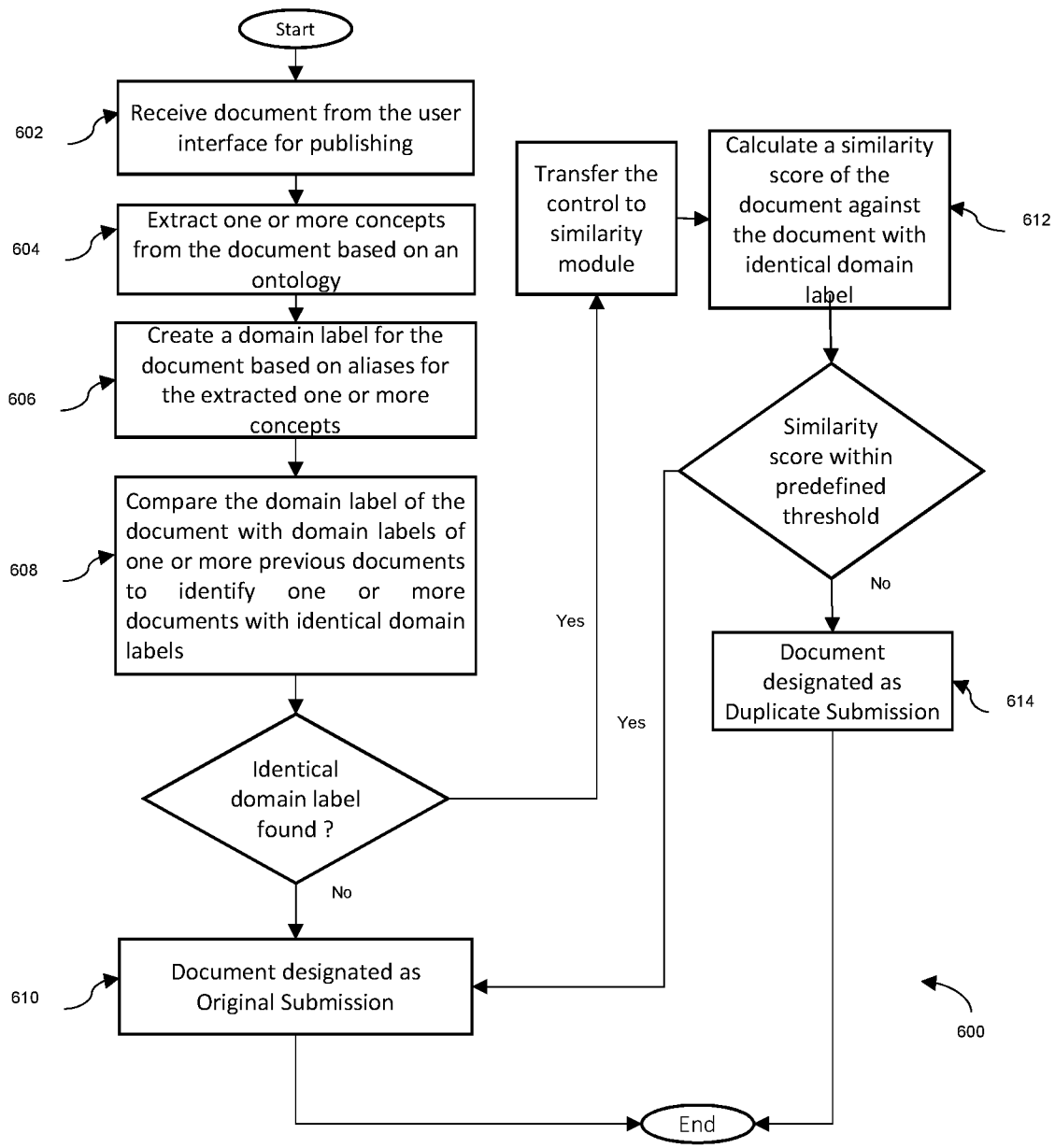
FIG. 6 is a flowchart depicting the method steps carried out for identifying a duplicate/near duplicate document.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only, memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer executable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer executable instructions for carrying out a plurality of operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present disclosure relates to a system and method to efficiently prevent publishing, on a publishing platform, of a duplicate document by determining originality of a document with respect to existing knowledge in the public domain, based on comparison of the document against a plurality of previous documents.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Throughout the present disclosure, the term 'document' as used herein, refers to a set of files in which an observation made in a scientific investigation or experiment is recorded, wherein the observation can be recorded in a form of one or more types of data. As an example, such documents are experiment results, pre-clinical reports, clinical reports, scientific articles, and theses. The term "Documents published in public domain" refers to research work already published and known to public at large. Hereinabove and after, the term 'public domain' refers to a plurality of digital libraries that publish technical documents. With respect to drug discovery, some examples of such digital libraries are New England Journal of Medicine (NEJM), The Lancet, Journal of the American Medical Association, Annals of Internal Medicine, The British Medical Journal, Elsevier and Pubmed. Additionally, optionally, public domain includes magazines, journals and articles pertaining to the pharmaceutical domain.

Additionally, optionally, the processor is configured to execute machine readable instructions to:
    obtain, from a plurality of database servers, one or more documents published in the public domain;
    process the one or more documents published in the public domain to extract metainformation of the one or more documents published in the public domain; and store metainformation of the one or more documents published in the public domain, in a memory device.

Hereinabove, the term "database servers" refers to the database servers related to a plurality of digital libraries that publish technical documents authored by various researchers or research organizations, while the term "plurality of documents" refers to all the documents that are available in the public domain, each document of the plurality of documents being related to one or more technical fields, and therefore, represent knowledge available publicly and form a "knowledge databank".

Further, the term "Documents existing locally" as used throughout this present disclosure, refers to documents previously submitted by one or more users, but not yet published in public domain. Furthermore, the term "previous documents" includes "Documents existing locally" and "Documents available in public domain".

Furthermore, the term "near-duplicate document" refers to a document which although is not exact duplicate copy but contains similar conceptual information as compared to one or more previous documents and includes paraphrased versions and/or texts including synonyms and lexical variations of texts included in one or more previous documents.

FIG. 1 is an exemplary representation of a system 100, wherein the system is configured to determine a duplicate and/or near duplicate document submission based on efficient comparison with one or more previous documents. The system comprises a processor 104 communicably coupled, via a data communication network 114, with a knowledge databank 106. The knowledge databank 106 as referred earlier is a repository of documents available in public domain. The knowledge databank 106 is implemented by way of data memory associated with the processor of the server arrangement. Alternatively, optionally, the knowledge databank 106 is implemented by way of a database arrangement communicably coupled with the processor through the data communication network 114, wherein the database arrangement comprises one or more databases. The system 100 comprises a platform 102 communicably coupled with the processor 104.

The processor 104 is further communicably coupled with a user interface 108. The term "user interface" refers to a graphical user interface unit or a command line interface which is configured to receive a document 118 from a user. Further, the user interface 108 is configured to receive one or more inputs from the user. The user interface is coupled to the platform 102.

In an embodiment of the present invention, the platform 102 is a web-based digital publishing platform that permits publication of documents in electronic form. The platform 102 is accessible from a variety of electronic devices including desktop computers, laptop computers, tablet computers, smartphones, etc. In another embodiment, the platform is a blockchain-based publishing platform that stores a plurality of published documents on a blockchain. Optionally, the platform 102 is communicably connected to the knowledge databank 106. Beneficially, the user interface 108 allows a user to access the platform 102. Throughout this disclosure, the term "publication" refers to electronic publishing or digital publishing or online publishing on publishing platforms. Further the term "publishing platform" refers to an electronic/digital content delivery medium that houses a plurality of documents for users to read or download.

The processor 104, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The processor 104 comprises an extraction module 116, a comparison module 118, a similarity module 120. The processor 104 is connected, through the data communication network 114, to an ontological databank 112, and a knowledge databank 106. Further, the processor 104 includes a memory 110. Optionally, the ontological databank 112 and knowledge databank 106 may be stored within the memory 110. Alternatively, optionally, the ontological databank 112 and the knowledge databank 106 may be stored on a distributed file system such as IPFS. Further, the ontological databank 112 and the knowledge databank 106 may be stored on a blockchain and be retrieved on fly in real time.

The ontological databank 112 comprises of one or more ontology databases wherein each of the one or more ontology databases comprises concepts specific to a domain. The term "domain" is a broad term intended to have its ordinary meaning. In addition, the term "domain" can include an area of expertise or a collection of material, information, content and/or other resources related to a particular subject or subjects. For example, a domain can refer to financial, healthcare, advertising, commerce, medical and/or biomedical-specific information, among other types of information.

Throughout this disclosure the term "ontology" refers to a data structure containing all relevant entities, possible relationships between those entities, and associated rules for a domain. An ontology is typically hierarchical in structure but is not restricted to only hierarchical structures. The entities in the ontology may be organized in Directed Weighted Graph (DWG) based ontologies, as well as hierarchical and/or single level classifications. The ontology further stores all related synonyms for each of the entities. Examples of ontologies may be found, for example, at each of the following Internet websites: Gene Ontology (http://www.geneontology.org) and Suggested Upper Merged Ontology (SUMO) (http://www.ontologyportal.org).

In an example embodiment of the present invention, the available ontologies include the ontologies for "Disease", "Drug", "Gene", "Target", "Proteomics", "Pathway". FIG. 2A depicts a sample portion of the disease ontology stored in the ontological databank 112 and is shown as 202. The disease ontology includes a list of the different types of diseases along with their synonyms. 202 depicts the hierarchical distribution of concepts under disease Lung Cancer including leaf nodes Small Cell Lung Cancer and Non-small Cell Lung Cancer wherein the leaf node Non-small Cell Lung Cancer further includes Adeno Carcinoma, Squamous Cell, and Large cell lung carcinoma. Similarly, as a non-limiting example, gene ontology 204 as shown in FIG. 2B includes TP53, EGFR, and KRAS.

In an exemplary embodiment of the present invention, documents are related to a domain of life science research and are indicative of information pertaining to at least a disease or a pathway or a target or a drug as entities and is furthermore indicative of semantic inter-relationships between two or more entities. Optionally, document enlists output of an experiment along with a strength of hypothesis of the experiment, measured in terms of pi-value, preferably called, throughout this disclosure, as "statistical significance". The document further contains meta-information corresponding to research information within the document and non-limiting example of such meta-information are title, abstract, hypothesis, statistical significance, author details, a domain to which the document pertains etc. The term entities and concepts are used interchangeably throughout this disclosure.

The extraction module 116 is operable to retrieve, from a document 118, meta-information pertaining to the document 118. Alternatively, optionally, the metainformation pertaining to the document 118 may be input, via the user interface 108, by a user. The retrieved metainformation allows identification of a domain associated with the document. Based on the identification of the domain associated with the document, the extraction module 116 selects at least one ontology from the ontological databank 112. The extraction module 116 is further operable to extract, using the selected ontology, one or more concepts from the document 118. In an embodiment, the one or more concepts are extracted from metainformation and/or full text of the document 118.

Optionally, the extraction module 116 is operable to identify semantic inter-relationship between the one or more concepts extracted from the document. In one of the embodiments of the present invention, sentences present in the document are processed by employing a frame semantic parsing technique to generate semantic frames, wherein these semantic frames are indicative of the one or more concepts and their semantic inter-relationships. Optionally, in this regard, the frame semantic parsing technique employs a directed acyclic transition-based recurrent neural network. Beneficially, the frame semantic parsing technique identifies the concepts and their semantic inter-relationships even when the concepts and their semantic inter-relationships may be defined very subjectively in the information pertaining to the document. These semantic frames are indicative of the concepts and the semantic inter-relationships specific to the document. Optionally, the semantic frames are also indicative of the technical field of the document. Furthermore, in one of the embodiments semantic inter-relationships derived from the extracted concepts form part of one or more aliases. Beneficially, a semantic inter-relationship between two given concepts is indicative of a causal relationship between the two given entities. As an example, in drug discovery, examples of a causal relationship between a drug and a disease could be "causes", "inhibits", "catalyses" and so on.

Optionally, a plurality of types of causal relationships are pre-defined, and the processor of the server arrangement is configured to execute machine readable instructions that cause the server arrangement to classify the semantic inter-relationships according to the plurality of types of causal relationships.

In the frame semantic parsing technique, sentences or phrases in a natural language are parsed and processed to generate semantic frames. In other words, lexical targets (namely, words and phrases) in their sentential contexts are processed to generate the semantic frames. Herein, the term "semantic frame" refers to a collection of facts or a coherent structure of related concepts that specify features that are typically associated with a particular word (for example, attributes, functions and interactions of a particular concept). As an example, a semantic frame observed in research work related to drug discovery could include at least two of: a drug, a pathway, a target, a disease.

Such a frame semantic parsing technique is optionally implemented using known techniques/model, for example as described in a published paper, titled "SLING: A framework for frame semantic parsing" (Michael Ringgaard et. al., available here https://arxiv.org/abs/1710.07032).

For illustration purposes only, there will now be considered an example document, whose summary, obtained as information pertaining to the example document, is as follows:

"This experiment was carried out in vivo to check if IL1b mRNA did not show any change in Cortex and Hippocampi. All LPS-induced changes were restored in 70 day old rats. 5 PUPs were treated with Saline and LPS (IP 2 mg/kg). mRNA level of pro-inflammatory cytokine (IL1b) was examined. Found that IL1b mRNA was left significantly unregulated in Substantia nigra. Further experiments like WB, ELISA were also conducted."

The summary of the example document (namely, the information pertaining to the example document) is processed to identify concepts and their semantic inter-relationships, wherein the concepts and their types are identified as follows:

Drug: LPS
Disease: pro-inflammatory cytokine
Target: Cortex and Hippocampi

An inference from the summary can be made as follows:
It was found that at the concentration levels of the drug (mentioned in the summary), LPS had no effect on the translation of cytokines. Therefore, the semantic inter-relationships can be represented as follows:
LPS—no effect—Cytokine For illustration purposes only, information contained in the abstract of the document is as follows:

"This experiment was carried out in vivo to check if IL1b mRNA did not show any change in Cortex and Hippocampi. All LPS-induced changes were restored in 70 day old rats. 5 PUPs were treated with Saline and LPS (IP 2 mg/kg). mRNA level of pro-inflammatory cytokine (IL1b) was examined. Found that IL1b mRNA was left significantly unregulated in Substantia nigra. Further experiments like WB, ELISA were also conducted."

The document 118 and the associated meta-information is processed to identify one or more concepts wherein the concepts and their types are identified as follows:

Drug: LPS
Disease: pro-inflammatory cytokine
Target: Cortex and Hippocampi

Further, the extraction module 116 is configured to receive a statistical significance score associated with the document 118.

The processor 104 is further configured to assign a domain label for a given document wherein the domain label is a structured combination of a plurality of aliases for the extracted one or more concepts retrieved by the extraction module 116. The processor 104 maintains a master repository 126 of alias-concept indexes for the plurality of concepts of the ontological databank 112. Preferably, each of the documents available in the public domain from the knowledge databank 106 is assigned a domain label, by identifying one or more concepts, by the processor 104 by processing each of the document as described in the foregoing paragraphs.

FIG. 3A, 3B, 3C, 3D shows a non-limiting example of a master repository 126 of alias-concept indexes maintained by the processor 104. FIG. 3A is an alias-concept index for diseases, wherein each of the diseases present in the disease ontology, as shown in FIG. 2A, is tagged with an alias. Throughout this disclosure, the term "alias" refers to an identifier comprising any set of characters, numerical, alphanumeric codes, Hex codes or any nomenclature system capable of referring to and identifying a distinct concept. As an example, Non-small cell lung cancer has been assigned an alias of D2 in the alias-concept index for diseases. Similarly, EGFR is assigned an alias of T2. Further, a p-value of greater than 60 is assigned alias of H. The master repository 126 of alias-concept indexes is stored in the memory 110.

As per the exemplary embodiment, the processor 104 identifies an index associated with each of the concept extracted by the extraction module 116. Based on the identification of indexes for the extracted concepts, the processor retrieves, from the corresponding indexes maintained by the processor in the memory 110, at least one alias for each of the extracted concepts. The aliases are combined together to form a domain label for each document wherein the domain label is a structured combination of the aliases retrieved for the extracted concepts from the document. With respect to the aforementioned example document, the extracted concepts are:

Drug: LPS
Disease: pro-inflammatory cytokine
Target: Cortex and Hippocampi

In the above example, the retrieved aliases would be 8432 for LPS, D78 for pro-inflammatory cytokine and T12, T14 for Cortex and Hippocampi. Therefore, the domain label for the document would be R432-D478-T12:14. The domain labels formed in this manner are saved, against each document identifier, by the processor in a master label repository.

FIG. 4 depicts a master label repository 122 maintained by the processor 104 in the memory 110 wherein the master label repository 122 comprises domain labels of previous documents listed against document identifiers of each of the previous documents. As shown, for a document S1, the retrieved aliases against extracted concepts are D1, P753 and L. Hence, the domain label of document is read as D1-L-P753. Similarly, P227-H-T81, D941-M-R432 are domain labels for documents.

The document identifiers, as mentioned throughout this disclosure, may be a set of characters, numerical, alphanumeric codes, Hex codes or any nomenclature system capable of referring to and identifying a document. In one of the example embodiments, as depicted in FIG. 4, the document identifiers used are S1, S2 and so on.

Optionally, the master label repository 122 is separated into two sub-groups of "Documents existing locally" 504 and "Documents available in public domain" 502, as depicted in FIG. 5. The term "Documents existing locally" refers to a set of documents which are submitted for publishing on the platform and are not yet published in public domain therefore not forming part of knowledge databank 106. Further, the term "Documents available in public domain" refers to a set of documents; which form part of the knowledge databank 106 and are available in public domain. The sub-groups as identified above have different set of identifiers for the documents contained therein.

Further, the processor 104 comprises a comparison module 124 configured to receive at least one domain label associated with the one or more previous documents, and a domain label corresponding to the document 118 received from the user for publication. The domain label of the document 118 is compared, by the comparison module 124, with the domain labels of the one or more previous documents to identify at least one domain label identical to the domain label associated with the document received from the user. Based on the identification of at least one domain label identical to the domain label of the document received from the user, the comparison module 124 is configured to transfer logic control to a similarity module 120.

Optionally, in case the comparison module 124 fails to identify an identical domain label for the document 118, the comparison module 124 is configured to identify a similar domain label based on comparison of the domain label of the document 118 with domain labels of one or more previous documents. Beneficially, a similar domain label is identified based on semantic similarity between the domain labels. In an embodiment of the present invention, the semantic similarity between the domain label is computed based on distance between the concepts, as indicated by the corresponding aliases in the domain label, represented by nodes in the hierarchical ontology specific to the technical field of the documents.

Once the determination of identical and/or similar domain label is complete, logic control flow transfers to the similarity module 120. The similarity module 120 retrieves, based on the corresponding document identifiers, one or more previous documents with identical domain labels as identified by the comparison module 124. Further the similarity module 120 is configured to determine a vector representing the document 118, in a n-dimensional space, using a vector space model. The similarity module 120 is further configured to determine one or more vectors representing the identified one or more documents with identical domain labels, in the n-dimensional space using the vector space model. Optionally, the similarity module 120 retrieves the one or more vectors for the one or more previous documents from the memory 110, wherein the one or more vectors for each of the previous documents are pre-calculated and stored in the memory along with corresponding document identifier. The similarity module 120 is configured to determine a similarity score for the document received from the user based on a cosine distance between the vector representing the document received from the user and the one or more vectors representing the identified one or more documents with identical domain labels. Optionally, the similarity score is determined based on Jaccard similarity. Optionally, the similarity is calculated based on space vector modulation technique. Based on the determination of the similarity score lesser than a predefined threshold value, the document 118 is identified as an original submission by the similarity module. Based on the determination of the similarity score greater than a predefined threshold value, the received document 118 is identified as similar, or near-duplicate, to the one or more documents with identical domain labels, by the similarity module. As an example, the similarity score of 0 for the received document represents an original document and the similarity score of 1 represents an exact replica of a compared existing document.

Optionally, the similarity module 120 is further configured to assign an originality rating for the document based on the calculated similarity score. Preferably, each of the documents in the knowledge databank 106, and the documents existing locally are assigned an originality rating. Optionally, a document can be designated as duplicate document or near-duplicate document based on pre-set values of similarity score. As a non-limiting example, for a similarity score below 0.3 the document is designated as original document, for a similarity score in the range 0.31-0.80 is designated as near-duplicate document, and for a similarity score above 0.8 the document is designated as duplicate document.

In an aspect of the present invention, the document 118 submitted for publication by the user can be sorted amongst the plurality of documents of the knowledge databank and documents existing locally on the memory 110. The sorted set of documents based on originality ratings are displayed on the user interface 108.

FIG. 6 is a flowchart depicting the method steps 600 carried out for identifying a duplicate/near duplicate document.

At step 602, a document is received from the user interface for publishing. At step 604, one or more concepts are extracted from the document based on an ontology. At step 606, a domain label for the document is created based on aliases for the extracted one or more concepts. At step 608, the domain label for the document is compared to one or more previous document to identify one or more documents with identical domain labels as that of the document. In case no identical domain labels are identified, the document is designated, at step 610, as original submission. Alternatively, if one or more documents with identical domain labels are identified, a similarity score of the document against the identified one or more previous documents with identical domain labels is computed at step 612. Further, if the similarity score lies within a predefined similarity score, the document is designated as original submission. In case, the similarity score is greater than the similarity score, the document is designated, at 614, as duplicate document.

In another embodiment, the comparison of domain label of the document 118 with the domain labels of the one or more previous documents is carried in a two-factor sequential process.

Figure 7:
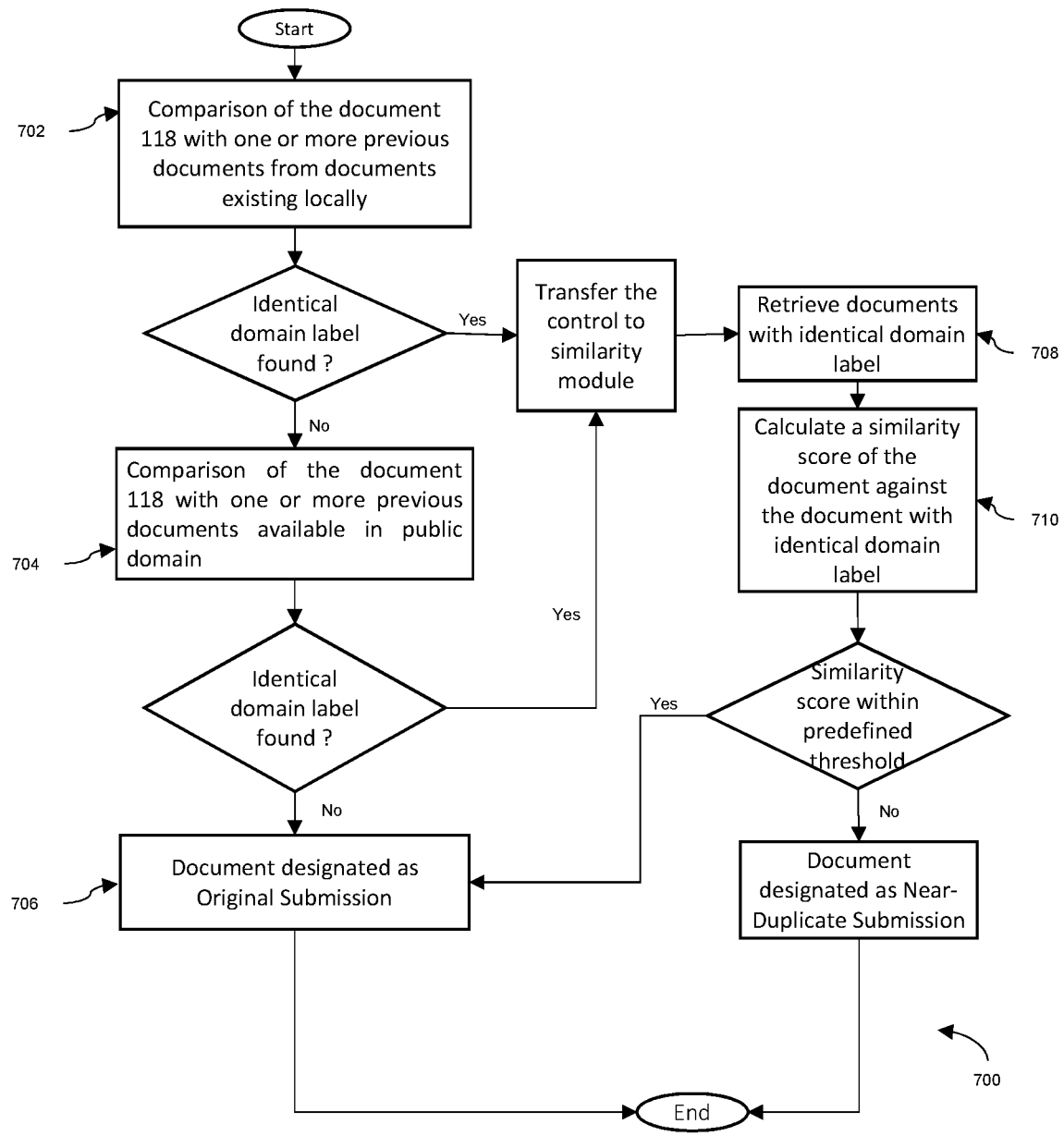
FIG. 7 is a flowchart depicting the method steps carried out for identifying a duplicate/near duplicate document in a two-factor process.

FIG. 7 depicts a process 700 executed by the comparison module 124 in comparing the domain labels of documents in a two-factor process. In first factor, at step 702, the comparison module 124 compares the domain label of the document 118 with the domain label of the one or more documents from the document existing locally sub-group 502 of the master label repository 122. Based on an unavailability of a domain label identical to the domain label of the document 118, the comparison module 124 is further configured to proceed to second factor wherein at step 704, the comparison module 124 compares the domain label of the document 118 with the domain label of the one or more documents from the document available in public domain sub-group 504 of the master label repository 122. Based on an unavailability of a domain label identical to the domain label of the document 118, the comparison module 124 is configured to designate the document 118 as an original submission at 706.

Optionally, if at first factor, a domain label of one of the one or more documents existing locally matches the domain label of the document 118, the comparison module 124 terminates the comparison process and transfers the control to the similarity module 120. Further, if at second factor, a domain label of one of the one or more documents available in the public domain matches the domain label of the document 118, the comparison module 124 terminates the comparison process and transfers the control to the similarity module 120.

The similarity module 120 retrieves, at step 708, one or more previous documents with identical domain labels as identified by the comparison module 124. The similarity module 120 is configured to determine, at step 710, a similarity score for the document 118 against the identified one or more documents with identical domain labels. Based on the determination of the similarity score lesser than a predefined threshold value, the document 118 is identified, at step 706 as an original submission by the similarity module. Based on the determination of the similarity score greater than a predefined threshold value, the received document 118 is designated, at step 712, as duplicate or near-duplicate, to the one or more documents with identical domain labels, by the similarity module.

Figure 8:
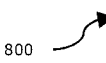
FIG. 8 depicts a similarity index.

In one of the embodiments, a similarity index is added to the metadata associated with the received documents, by the similarity module 120, wherein, the similarity index comprises a mapping of each document against one or more duplicate or near-duplicate documents based on the similarity score being within a predefined threshold. Further, the similarity index may have additional attribute storing the similarity score as against the listed document. The said index may be used to identify a list of near-duplicate or duplicate documents, as the case may be, against an input document given a range identifier (for deciding similarity score ranges for near-duplicate or duplicate tagging) by a user through the user interface. FIG. 8 depicts the similarity index 800 as per the described embodiment.

In another embodiment, the processor 104 is configured to enable the user, via a graphical user interface 108 communicably coupled to the server arrangement, to modify the threshold value of the similarity score.

In another embodiment, the processor 104 is configured to identify one or more near-duplicate and/or similar documents against a document received from the user by looking up the similarity index for the document identifiers against the domain label of the document received from the user.

In another aspect of the present invention, the document 118 is prevented from being published on the platform 102 based on determination of the document being a duplicate or near-duplicate document. This protects the integrity of the platform in so far as only original documents are available for one or more researchers for study and research purposes.

In another embodiment of the present invention, the processor 104 is implemented in a distributed fashion of client server architecture wherein the extraction module of the processor 104 resides in a client environment. In operation, a document 118 is received for publication on the platform 102. The extraction module 116, residing in the client environment, accesses the document 118 and metainformation associated with the document 118. The extraction module further extracts, based on an ontology pertaining to a technical field of the document 118, one or more concepts and semantic inter-relationship between the concepts from the document 118. Optionally, the extraction module 116 further comprises a feature extraction module 130. The feature extraction module 130 is operable to create feature vectors of the document 118 wherein the feature vectors are word vectors created based on extracted concepts. Once the feature vectors are determined, the one or more extracted concepts, the feature vectors for the document along with the semantic inter-relationship between the extracted concepts as mentioned in the document, is transmitted to the server arrangement.

The server arrangement is communicably coupled with a processor comprising a comparison module, a similarity module, and a memory. The processor receives the one or more extracted concepts, the feature vectors for the document along with the semantic inter-relationship between the extracted concepts as mentioned in the document, assigns a document identifier against the document 118 and stores, in the memory, the received information against the assigned document identifier. The comparison module 124 creates a domain label for the document based on the process described in the foregoing paragraphs related to operation of the preferred embodiment. Further, the comparison module compares the domain label for the document 118 against the domain labels of one or more previous documents to identify an identical and/or similar domain label to the domain label of the document 118. Preferably, the comparison module 124 identifies the identical and/or similar domain label against the domain label of the document 118 based on nay of the processes defined in the foregoing paragraphs. Based on an identification of one or more identical and/or similar domain label, the similarity module 120 is configured to retrieve document identifiers pertaining to the identified documents and access, from the knowledge databank and/or from the memory, the said identified documents using the retrieved document identifiers. The similarity module 120 is further operable to create feature vectors for the identified documents and identify a similarity score based on cosine similarity of the received feature vector of the document 118 and the feature vectors of the identified documents with identical and/or similar domain labels. Optionally, the processor is configured to store feature vectors against the previous documents in the memory 110 and the feature vectors for one or more previous documents are retrieved on the fly for similarity computations. Based on determination of the similarity score being within a predefined threshold value, the document is identified as a near duplicate document. Further, an originality rating is assigned to the document based on the determined similarity score. Implementation of the disclosed system as per the alternate embodiment enables a user to identify an originality of the document without submitting the document to an external platform thereby maintaining confidentiality and integrity of the document. Further, such determination of originality may result in enhanced valuation of the document. In an embodiment of the present invention, the processor assigns a monetary value to the document relative to the previous documents pertaining to the technical field of the document. The user interface 108 may enable the user to transact such documents based on their originality ratings and valuation. The transaction process, as described above, eliminates the need of a third-party intermediary.

Throughout this disclosure the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device.

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

The invention claimed is:

1. A computer-implemented method for identifying a duplicate document submission on a publishing platform, the method comprising:

receiving a request for publication of a document on the publishing platform;

triggering an extraction module to extract one or more concepts, and meta-information from the document, wherein the one or more concepts are associated with at least one ontological databank related to a technical domain of the document;

assigning at least one domain label for the document, wherein the domain label comprises a structured combination of a plurality of aliases for the one or more concepts and wherein the plurality of aliases is selected from a master repository of alias-concept index;

comparing the domain label of the document with the domain label of one or more previous documents to identify one or more documents with an identical domain label;

calculating a similarity score against the one or more documents with the identical domain label;

identifying the duplicate document submission based on the calculated similarity score wherein identifying the duplicate document submission is based upon the determination of at least one document of the one or more previous documents with the identical domain label being within a predefined threshold;

preventing the publication of the document on the publishing platform based on the identification of the duplicate document submission.

2. The method of claim 1, wherein the one or more previous documents comprises documents existing locally within a memory associated with a processor implementing the method, and documents published in public domain.

3. The method of claim 1, wherein the method further comprises comparing the domain label of the document with one or more documents existing locally prior to comparing the domain label of the document with one or more documents published in public domain.

4. The method of claim 1, wherein the method further comprises creating a similarity index for the one or more previous documents, the similarity index being a mapping of a document identifier for each document from the one or more previous document against documents identifiers of one or more previous documents with similar domain label.

5. The method of claim 4, further comprising retrieving, based on the similarity index, one or more similar documents against an input document.

6. The method of claim 1, wherein the method further comprises comparing the domain label of the document to one or more previous documents to identify one or more documents with a similar domain label.

7. The method of claim 1, wherein the master repository comprises an index of each of the one or more concepts of an ontology mapped to at least one of the plurality of aliases.

8. The method of claim 1, wherein the document is assigned an originality rating based on the similarity score.

9. The method of claim 8, wherein the method further comprises sorting the document amongst the plurality of previous documents, based on the originality rating.

10. A system for identifying a duplicate document submission on a publishing platform, the system comprising:
a processor;
a memory configured to execute machine readable instructions that, when executed by the processor, configure the system to perform a plurality of operations, the operations comprising:
receiving a request for a publication of a document on the publishing platform;
triggering an extraction module to extract one or more concepts, and meta-information from a document, wherein the extracted one or more concepts are associated with at least one ontology related to a technical domain of the document;

assigning a domain label for the document, wherein the at least one domain label comprises a structured combination of a plurality of aliases for the extracted one or more concepts and wherein the plurality of aliases is selected from a predefined master repository of alias-concept index;

comparing the domain label of the document with the domain label of one or more previously existing documents to identify at least one document with a similar domain label;

calculating a similarity score against the identified at least one document with similar domain label;

identifying the duplicate document submission based on the calculated similarity score wherein identifying the duplicate document submission is based upon the identified at least one being within a predefined threshold distance from the document; and preventing the publication of the document on the publishing platform based on the identification of the duplicate document submission.

11. The system of claim 10, wherein the one or more previous documents comprises documents existing locally within the memory, and documents published in public domain.

12. The system of claim 10, wherein the method further comprises comparing the domain label of the document with one or more documents existing locally, prior to comparing the domain label of the document with one or more documents published in public domain.

13. The system of claim 10, wherein the method further comprises comparing the domain label of the document to one or more previous documents to identify one or more documents with a similar domain label.

14. The system of claim 10, wherein the predefined master repository comprises an index of each of the one or more concepts of the at least ontology mapped to at least one of the plurality of aliases.

15. The system of claim 10, wherein the method further comprises creating a similarity index for the one or more previous documents, the similarity index being a mapping of a document identifier for each document from the one or more previous document against document identifiers of one or more previous documents with similar domain label.

16. The system of claim 15, further comprising retrieving, based on the similarity index, one or more similar documents against an input document.

17. The system of claim 10, wherein the document is assigned an originality rating based on the similarity score.

18. The system of claim 17, wherein the method further comprises sorting the document amongst the plurality of previous documents, based on the originality rating.

* * * * *